United States Patent [19]

Hill

[11] 4,204,144
[45] May 20, 1980

[54] POSITION CONTROL SYSTEM

[75] Inventor: Richard D. Hill, Skokie, Ill.

[73] Assignee: Midgitronics Inc., Oregon, Wis.

[21] Appl. No.: 841,729

[22] Filed: Oct. 13, 1977

[51] Int. Cl.² ............................................. G05B 19/42
[52] U.S. Cl. .................................... 318/568; 318/591;
318/603; 318/490; 340/679
[58] Field of Search ............... 318/568, 162, 565, 591,
318/603, 490; 364/474, 518, 522; 340/679, 680, 686

[56] References Cited

U.S. PATENT DOCUMENTS

| | | | |
|---|---|---|---|
| 2,922,081 | 1/1960 | Dubin | 361/391 |
| 3,072,833 | 1/1963 | Kerr et al. | 318/568 |
| 3,783,253 | 1/1974 | Anderson et al. | 318/568 |
| 3,828,318 | 8/1974 | Bennett et al. | 318/568 X |
| 4,010,356 | 3/1977 | Evans | 318/568 X |
| 4,042,866 | 8/1977 | Morita et al. | 318/568 |
| 4,090,240 | 5/1978 | Blanchard | 318/568 |

*Primary Examiner*—Benjamin Dobeck
*Attorney, Agent, or Firm*—Wegner, Stellman, McCord, Wiles & Wood

[57] ABSTRACT

A positioning control system for a manually operated machine tool. When programmed by an operator, the system provides a visual indication of the necessary incremental movement of a movable member, as a machine tool bed, to a series of desired preselected positions. The system displays a zero indication when the operator reaches the desired position. The incremental movement to the next position is then displayed, permitting the operator to move the movable member to that position under the guidance of the display which again goes to zero when the position is reached. The system permits the operator to enter the location of each desired preselected position, and entry of each position may be made with respect to a common reference coordinate. Each position is stored in a memory for repeated use in guiding the operator in positioning the movable member. The system also includes a display for identifying each step in which the control is functioning and means for inverting each coordinate of each position to place the selected position in any one of the four quadrants. The system may be mounted in a cabinet to protect it from a hostile environment.

10 Claims, 4 Drawing Figures

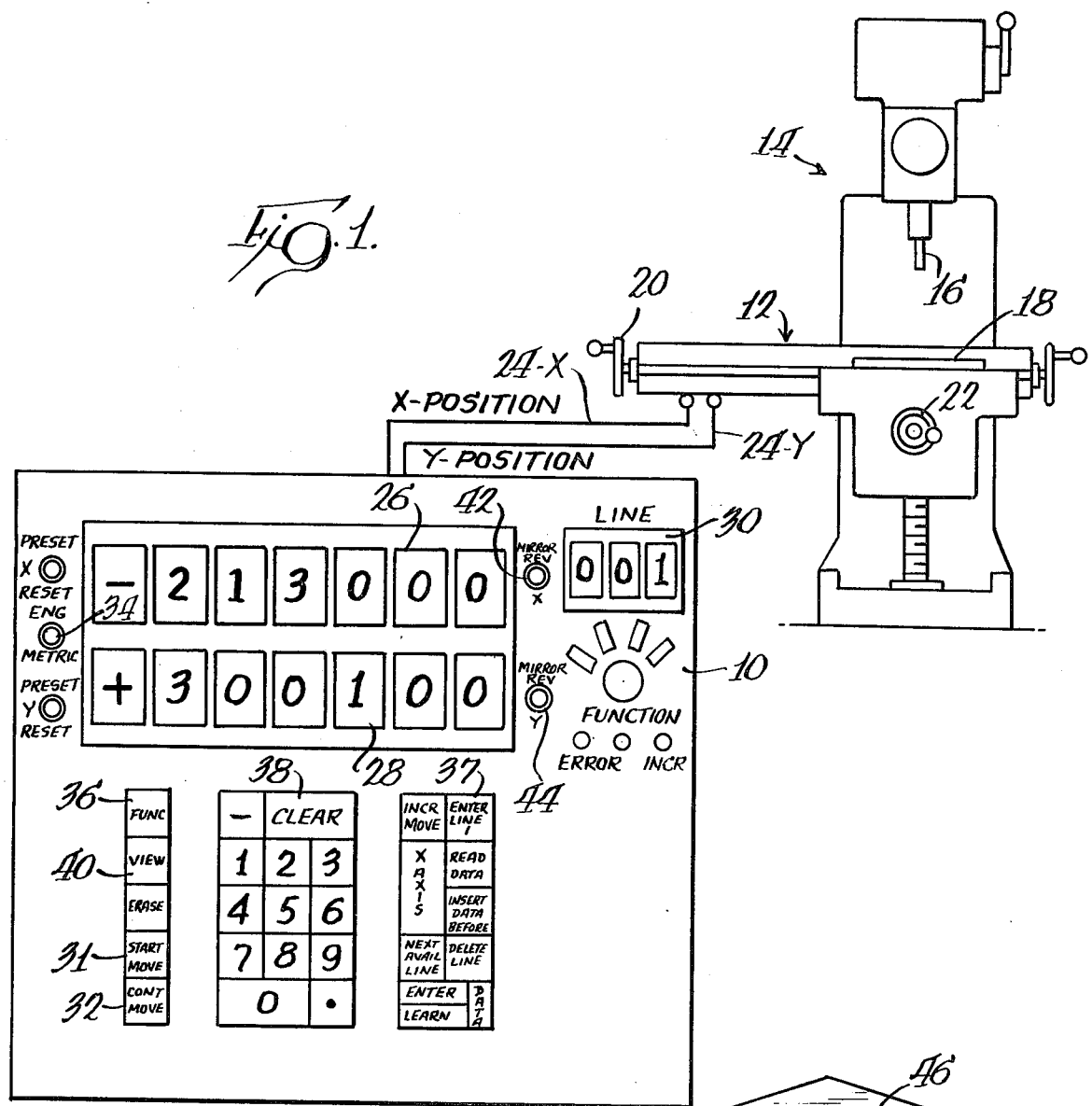
Fig. 1.
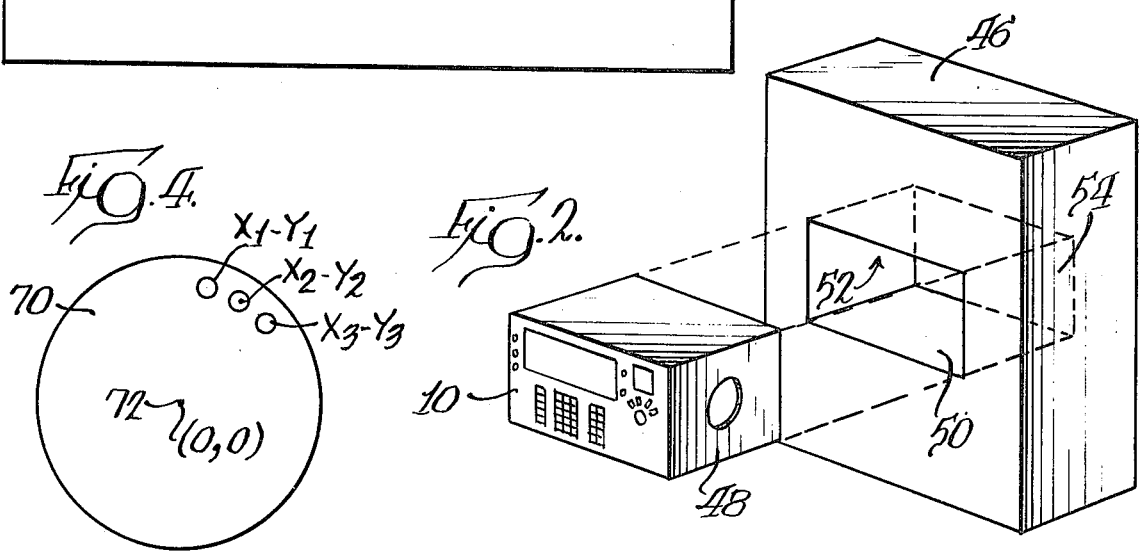
Fig. 4.
Fig. 2.

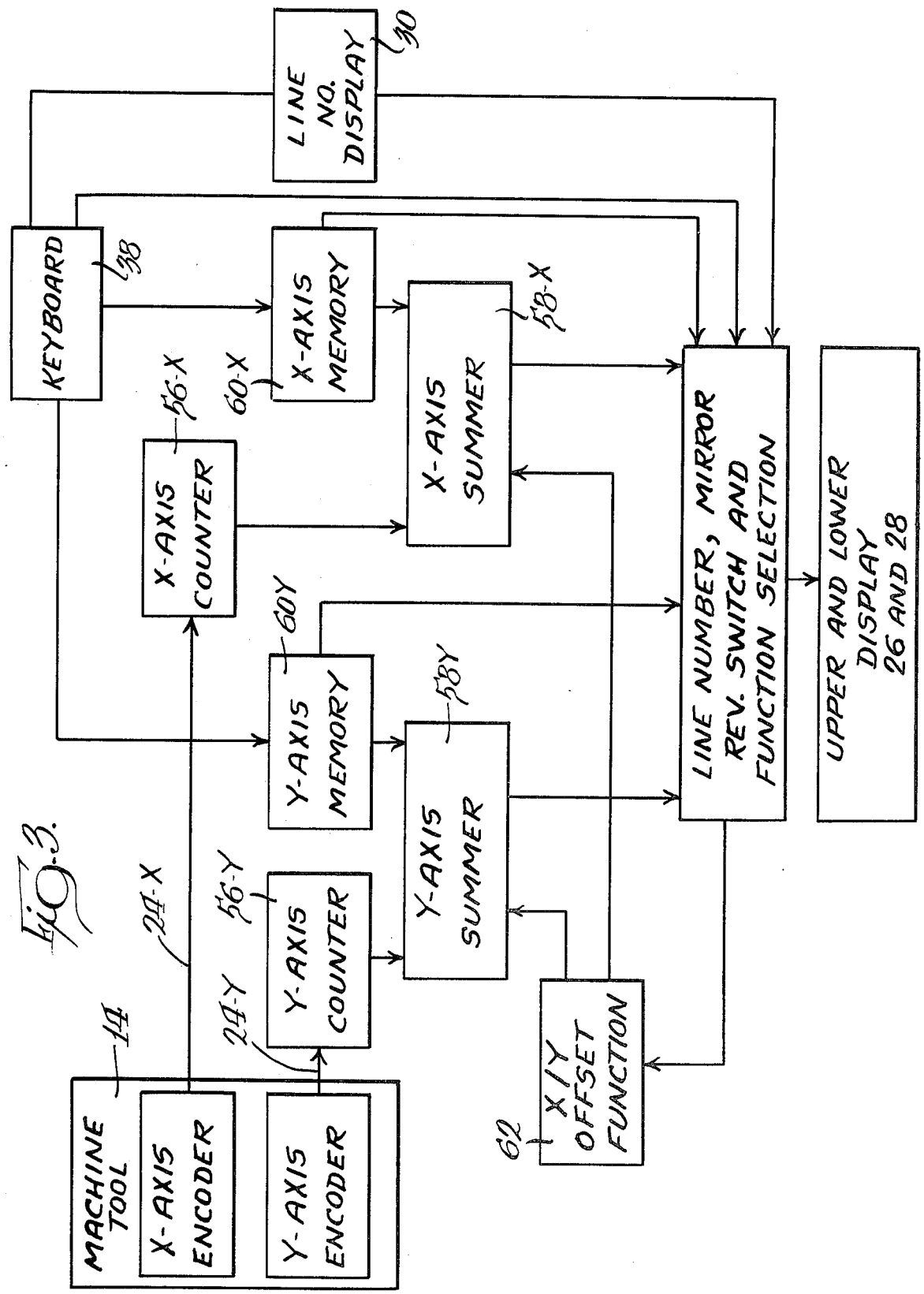

POSITION CONTROL SYSTEM

BACKGROUND OF THE INVENTION

1. Field of the Invention

This invention relates to position control systems and, in particular, to systems for use in selectively positioning a movable member of an operator-positionable machine tool to preselected positions.

2. Description of the Prior Art

In the positioning of movable members, such as machine tool beds, encoding devices provide an accurate indication of the X and Y coordinates of the position of the movable member. One such encoding device includes a transducer that responds to the movement of an actuator mounted for movement with the machine tool bed.

Such encoders have been coupled to a digital readout counter to display position information with respect to a reference coordinate or reference position. The operator may control the bed-moving mechanism of the machine tool under the guidance of the display so that the display indicates when the position of the bed corresponds to the desired positions. When moving from point to point, the operator must compare the present position of the machine tool bed to the next desired position as defined by the blueprint. The operator must then guide the movable member to that next desired position and recheck the blueprint to determine that the machine tool bed is in the desired position. This is cumbersome and often results in error.

Another device manufactured by Anilam Electronics Corp. of Miami, Fla., employs a similar encoder, but displays a zero indication each time the operator reaches the successive desired positions. This device is considered to be an improvement of the device discussed above. Unfortunately, however, this device requires that the operator individually increment the preceding X and Y coordinates to define the next desired position when entering the plurality of selected points in the device when programming it. The coordinate information on blueprints or charts is usually defined from a common reference point rather than X and Y incremental additions to preceding points. Thus, when entering the data into this device, the operator must make successive calculations of the difference between the X and Y coordinates of successive points.

SUMMARY OF THE INVENTION

In accordance with the present invention, an improved system for indicating position information of a movable member to an operator of an operator-positionable machine tool is provided. The X and Y coordinates of each of the series of desired preselected positions may be entered into the system with respect to a reference coordinate or reference position. A display identifies the preselected position by a step number and indicates to the operator the direction and magnitude of the X and Y distances to the preselected position.

It is a feature of the present invention to provide a position control system for a manually operated machine tool wherein the system permits the operator to enter the location of each of a plurality of desired positions with respect to a common reference coordinate or position, and to provide a display that indicates the magnitude and the direction of the distance to be traveled by the movable element to the next desired position.

Another feature of the present invention is to provide a means for inverting each coordinate of each position so that any selected position can be relocated in any one of the four quadrants.

It is another feature of the present invention to include a system wherein the individual positions may be entered with respect to a common reference while providing X and Y offset functions which can be added to each coordinate to offset any position error.

Yet another feature of the present invention is to provide a housing which receives the chassis of the system wherein ports are provided in the chassis, through which forced air may be passed to remove heat. When inserted therein, the chassis is sealed from hostile environments.

BRIEF DESCRIPTION OF THE DRAWING

FIG. 1 is a view of the front panel of the control system coupled to a typical operator-positionable machine tool contemplated by the present invention;

FIG. 2 is a perspective view of the system mounted within a protective housing;

FIG. 3 is a block diagram of the circuit of the present invention; and

FIG. 4 is a plan view of a typical workpiece wherein a plurality of holes is to be drilled at the locations shown.

DESCRIPTION OF THE PREFERRED EMBODIMENT

In the exemplary embodiment of the invention as disclosed in the drawings, a control system, generally designated as 10, is coupled to a movable element, as tool bed 12, of machine tool 14 to perform a series of operations by tool 16 on workpiece 18. The position of the workpiece 18 with respect to the tool 16 is controlled by handles or wheels 20 and 22. The rotation of wheel 20 provides movement of macine tool bed 12 in the X direction, and rotation of wheel 22 provides movement in the Y direction.

Although the machine tool 16 is diagrammatically shown to be similar to a so-called Bridgeport milling machine, it is apparent that the control system 10 could be employed with any type of machine tool in which it is desired to move successively from one selected position to another.

Tool bed 12 is provided with a suitable and well-known encoder (not shown) to provide X and Y position information with respect to tool 16. Position information is provided to control system 10 by conductors 24-X and 24-Y.

The front panel of control system 10 includes an upper digital display 26 having seven digits, a lower digital display 28, also having seven digits, and a digital line display 30 having three digits. Line display 30 indicates which preselected position is being considered by the conrol system. As will be explained in detail below, upper display 26 and lower display 28 provide a visual indication to an operator of the magnitude and distance that must be traveled from the coordinates of a current position of the tool bed 12 to arrive at the position originally entered into the control system for the corresponding line number of line display 30. Thus, as shown in FIG. 1, if — is selected to indicate movement to the left and + is selected to indicate movement to the right, the upper and lower displays 26 and 28 and line display 30 indicate to the operator that for the line number 01, the operator must rotate wheel 20 so that the tool bed 12 moves in the X direction and to the left 2.130 inches, and must also rotate wheel 22 so that tool bed 12 moves in the Y direction and to the right 3.001 inches. A − appearing on display 26 or 28 may therefore indicate to the operator that he is to rotate wheel 20 or wheel 22, respectively, counterclockwise. A + indicates that a wheel is to be rotated clockwise. When the desired position corresponding to line position 01 is reached, upper display 26 and lower display 28 are zero and tool 16 may be applied to workpiece 18.

The line sequence is begun by depressing START MOVE 31 and continues by successively depressing CONT MOVE 32, which causes line display 30 to advance to 02. In the above example, the magnitude and the direction of the X and Y distances that must be traveled by tool bed 12 to the next line position are displayed by upper and lower displays 26 and 28, respectively. The operator continues successive positioning and machining until the tool 16 has been positioned above each desired position.

Several other functions on the front panel of control system 10 shall be briefly described. The position of ENG/METRIC switch 34 determines whether the information displayed on upper and lower displays 26 and 28 are in metric units or in English units (i.e., centimeters or inches). FUNC push button 36 provides for the entry of numbers which represent functions to be displayed in lower display 28 in lieu of X and Y coordinate position information. For example, if digits 01 appear on lower display 28 at a line number defined by line display 30, this may indicate to the operator that a tool change is in order. Other functions may be represented by other digits, as 02, 03, etc. Keyboard 38 is used for entering line numbers and the X and Y coordinates of the selected position, and VIEW push button 40 provides a display of the coordinates from the common reference coordinate or position. Mirror X reverse switch 42 and mirror Y reverse switch 44 transpose any selected coordinates into any one of the four quadrants, as will be discussed with reference to FIG. 5B below. The remaining push button switches and selector switches are named to represent their function, and the purpose of each should be apparent without further explanation.

Referring to FIG. 2, control system 10 may be placed in a housing 46. The housing 46 may be self-contained and may provide control system 10 with suitable cooling, as by a fan, and power required for its operation. Conductors for the input power to the housing and conductors 24 for machine tool 14 are not shown. Chassis 48, in which control system 10 is mounted, may be inserted into opening 50, the shape of which generally conforms to chassis 48. Housing 46 and chassis 48 may be provided with openings 52 and 54 which permit recirculating airflow through ports 49 of chassis 48 so that air is circulated and the heat is dissipated throughout housing 46. If the housing is made of aluminum, for example, even heat dissipation is realized. By the use of housing 46, control system 10 is protected from any hostile environment.

A short discussion will now be provided on the manner in which the coordinates of the selected positions are entered into the control system 10. The operator reviews a blueprint or chart of the machining program to be executed. By the use of keyboard 38, the operator enters the X and Y coordinates of each of the points on the chart or blueprint for the line number corresponding to each of the desired positions as discussed above. Each of the coordinates so entered may be made with respect to a common reference coordinate or position. Each of the X and Y coordinates for each of the locations corresponding to the line number is successively entered into the control system 10 and is stored in memories. Also, various functions (as discussed previously) may be intermixed with coordinate information for the various line numbers throughout the machining process. In an alternate mode of operation, individual coordinate information for each line number may be entered as an increment to a previously entered position if the blueprint or chart is not provided with a common reference coordinate or position.

Referring to FIG. 3, a block diagram of the control system 10 is shown. It is apparent that there are a number of digital circuits which would be capable of executing the required functions to be discussed, and the substitution of one specific circuit for another may be considered well within the skill of the art. Also, it is not inconceivable that a computer program could be specifically written and employed with a general purpose computer to execute the functions to be described. Position information from machine tool 14 is provided on conductors 24-X and 24-Y to X axis counter 56-X and Y axis counter 56-Y, respectively. The outputs from the X axis counter 56-X and the Y axis counter 56-Y are digital words indicative of the actual X and Y positions of machine tool bed 12 with respect to a common reference coordinate or position. The digital information from counters 56 may be in any acceptable format such that the length or the magnitude of the digital words therefrom is proportional to the actual X and Y positions of the tool bed 12.

The position information is the form of a digital word indicative of the X coordinate from the X axis counter 56-X is applied to X axis summer 58-X. Also applied to X axis summer 58-X is information from X axis memory 60-X. The information from the memory includes the value of the X coordinate that corresponds to the selected line 30, as originally entered at keyboard 38 by the operator. The information from X axis memory 60 is of a digital form and similar to the form of the digital information from X axis counter 56-X. The X axis value, as stored by X axis memory 60-X is combined with the digital word from X axis counter 56-X at X axis summer 58-X and the difference in magnitude is provided to upper display 26. Thus, when the output from X axis memory 60-X equals the output from X axis counter 56-X, the output from X axis summer 58-X is zero and the display 26 indicates 0.000, or that the operator has positioned the X coordinate of the tool bed 12 at the selected desired position. The X axis summer 58-X may be any digital device capable of subtracting two digital quantities and providing a digital word on the output representing the difference therebetween.

Y axis counter 56-Y, Y axis memory 60-Y and Y axis summer 58-Y operate in an identical manner to that described above with respect to the Y coordinate that corresponds to the selected line number 30 as originally entered. The information from the Y axis summer 58-Y is applied to the lower display 28.

Thus, it is apparent that after the operator enters each of the X and Y coordinates of each of the series of preselected points with respect to a common reference coordinate, the distance required to travel to the preselected position, as defined by the line number, is displayed in coordinate form by displays 26 and 28.

X and Y offset function 62 provides a digital word representing a desired distance to X axis summer 58-X and/or Y axis summer 58-Y. The offset may be added to the output of the summers 58 to accommodate slight position error as, for example, error introduced into the system by a worn machine tool bed.

Referring to FIG. 4, a brief explanation will be provided with respect to the use of mirror reverse switches 42 and 44. As seen in FIG. 4, three holes 64, 66 and 68 have been drilled in workpiece 70. The positions of the holes are defined by the distances X1-Y1, X2-Y2 and X3-Y3. These distances are measured from common reference coordinate 72. If X mirror reversing switch 42 is switched, the displays 26 and 28 will display the positions -X1-Y1, -X-Y2 and -X3-Y3. Thus, it is apparent that the operator can now position the tool bed 12 so that three holes representing the mirrored position can be successively drilled in the second quadrant of the circular workpiece 70, as shown. By switching the Y mirror reversing switch 44, the displays provide position information for three similar holes in the fourth quadrant as shown in FIG. 4. Similarly, if both mirror reversing switches 42 and 44 are switched, the display would provide guidance to the operator so that the three holes may be drilled in the third quadrant, as shown in FIG. 4.

I claim:

1. A method of positioning a movable element of a machine tool in a series of preselected positions comprising the steps of:
   (a) establishing a reference coordinate;
   (b) selecting a series of preselected positions;
   (c) determining the X and Y coordinates relative to said reference coordinate of each of the positions in the series of preselected positions;
   (d) entering and remembering each of said X and Y coordinates;
   (e) determining the actual X and Y positions of the movable element with respect to said reference coordinate;
   (f) selecting a first of said positions from the series of preselected positions;
   (g) summing said X coordinate of the actual position of the movable element with the X coordinate of the selected first position to provide a difference therebetween;
   (h) summing said Y coordinate of the actual position of the movable element with the Y coordinate of the selected first position to provide a difference therebetween;
   (i) displaying the differences in a display;
   (j) moving the movable element so that the differences are zero at the selected position;
   (k) selecting a second of said positions from said series; and
   (l) repeating steps (g) through (j).

2. The method of claim 1 further including the step of zeroing the display when said differences are zero.

3. The method of claim 1 further including the step of reversing the X and/or Y coordinate to provide a mirror reverse coordinate.

4. The method of claim 1 further including the step of adding a selected offset to said X and Y coordinates of the selected position.

5. In a machine tool having a movable member which may be successively positioned by an operator from point to point with respect to a common reference coordinate, an improved position control system comprising:
   means for generating signals representing the X and Y distances between the common reference coordinate and the actual position of the movable member;
   means for entering X and Y coordinates of each of the series of preselected positions;
   means for remembering each of said X and Y coordinates of said preselected positions;
   summing means for providing the difference between the actual position of said movable member with the X and Y coordinates of each of the selected positions respectively;
   means for displaying said differences; and
   means for moving said movable member so that said differences are zero when said movable member is located at said preselected positions.

6. The machine tool of claim 5 further including means for selecting any one of said series of preselected positions.

7. The machine tool of claim 6 further including means for displaying the preselected point selected by said means for selecting.

8. The machine tool of claim 5 further including means for mirror reversing the X difference and/or the Y difference.

9. The machine tool of claim 5 further including means for adding an offset to said X difference and said Y difference.

10. The machine tool of claim 5 further including:
    a chassis on which said improved position control system is mounted;
    a housing having an opening for receiving said chassis and two side openings;
    ports in said chassis for passing air across said chassis and the two side openings for cooling so that recirculated air is contained within said housing and said chassis; and
    means for recirculating said recirculated air.

* * * * *

UNITED STATES PATENT AND TRADEMARK OFFICE
CERTIFICATE OF CORRECTION

PATENT NO. : 4,204,144
DATED : May 20, 1980
INVENTOR(S) : RICHARD D. HILL

It is certified that error appears in the above-identified patent and that said Letters Patent are hereby corrected as shown below:

Column 6, line 21 (Claim 5, line 10), cancel the last word "the" and substitute therefor --a--;

line 26 (Claim 5, line 15), cancel the last word "with" and substitute therefor --and--.

Signed and Sealed this

Twelfth Day of August 1980

[SEAL]

Attest:

SIDNEY A. DIAMOND

Attesting Officer

Commissioner of Patents and Trademarks